Dec. 4, 1956  L. G. OPEL ET AL  2,773,203
DYNAMOELECTRIC MACHINE
Filed Aug. 28, 1953
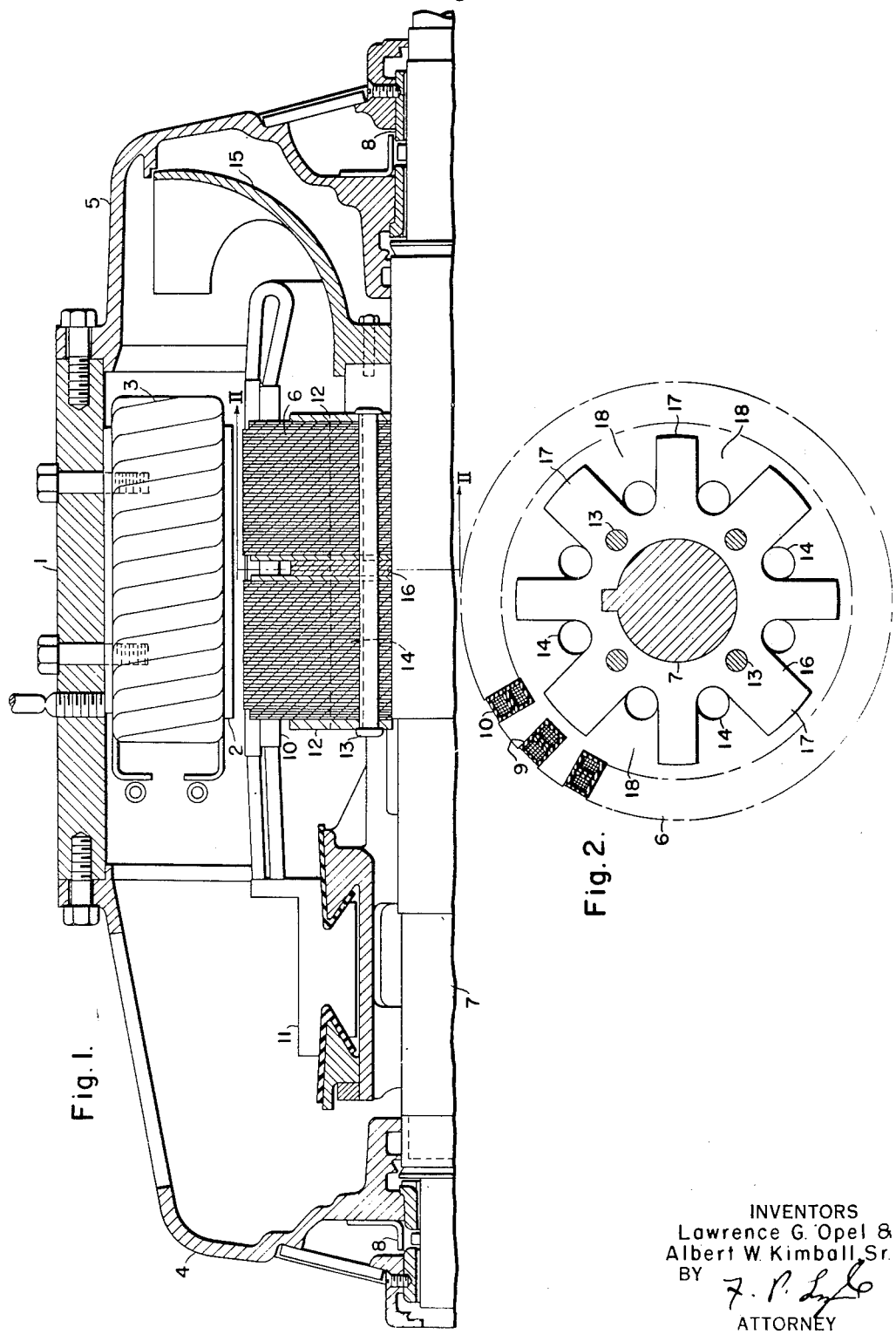
INVENTORS
Lawrence G. Opel &
Albert W. Kimball, Sr.
BY
ATTORNEY

United States Patent Office 2,773,203
Patented Dec. 4, 1956

2,773,203

DYNAMOELECTRIC MACHINE

Lawrence G. Opel, Tonawanda, and Albert W. Kimball, Sr., Buffalo, N. Y., assignors to Westinghouse Electric Corporation, East Pittsburgh, Pa., a corporation of Pennsylvania Application August 28, 1953, Serial No. 377,062

1 Claim. (Cl. 310—65)

The present invention relates to dynamoelectric machines, and, more particularly, to the ventilation of the rotor members of such machines.

Dynamoelectric machines are usually ventilated by circulation of air through ventilating passages in the machine, and axial ventilating passages are frequently provided in the rotor members of such machines to assist in removing the heat generated in the rotor windings. If the rotor is relatively long, it is often desirable, or necessary, to provide one or more radial ducts communicating with the axial passages. In the usual practice, these radial ventilating ducts have been formed by means of finger plates consisting of a lamination or punching similar to the rotor core laminations, with a plurality of radially extending fingers riveted to the lamination, so that when it is assembled in the core, the fingers space the adjacent lamination away from the finger plate to provide a radial space or duct. This means of providing radial ducts, however, is relatively expensive, since the operation of riveting the fingers to the finger plate is laborious and time-consuming, resulting in a high labor cost. This practice also has the disadvantage that the fingers necessarily extend to the periphery of the core, and, therefore, extend up between the conductors of the winding. When the rotor is dipped in insulating varnish and baked after winding, varnish is likely to adhere to the fingers in the spaces between the conductors, so that these spaces are restricted and may become plugged up with varnish, partially or entirely closing off the duct, and seriously impairing the ventilation.

The principal object of the present invention is to provide a dynamoelectric machine having a rotor member which is provided with radial ventilating ducts in a simple and inexpensive manner.

Another object of the invention is to provide a rotor member for a dynamoelectric machine in which radial ventilating ducts are formed by means of vent laminations placed between the laminations of the rotor core to space them apart, thus forming a radial duct, the vent laminations being of smaller diameter than the core laminations to eliminate any possibility of restricting the openings between winding conductors, and having generally radial slots communicating with axial ventilating passages in the rotor.

Other objects and advantages of the invention will be apparent from the following detailed description, taken in connection with the accompanying drawing, in which:

Figure 1 is a longitudinal sectional view of a dynamoelectric machine embodying the invention; and Fig. 2 is a transverse sectional view of the rotor member, taken approximately on the line II—II of Fig. 1.

The invention is applicable to rotor members of any type, for use in any type of dynamoelectric machine, and is shown in the drawing as applied to the rotor of a direct-current machine. The machine shown in the drawing, for the purpose of illustration, has a stator member including a frame 1 on which are mounted salient pole pieces 2, with field windings 3 on the pole pieces, and end brackets 4 and 5 of any suitable type secured at the ends of the frame 1. The rotor member has a laminated core 6 secured on a shaft 7, which is supported in bearings 8 in the end brackets 4 and 5. The rotor core 6 is provided with peripheral slots 9 in the usual manner, and an armature winding 10 of any suitable type is placed in the slots 9 and connected to a commutator 11 mounted on the shaft 7. The laminations of the rotor core 6 are clamped between end plates 12 by rivets 13, or in any other desired manner. Axial ventilating passages 14 extend through the rotor core and end plates, for the passage of ventilating air, and a fan or blower 15 may be mounted on the shaft 7 for effecting the desired circulation of air through the machine.

The rotor core 6 is provided with a radial ventilating duct at its center, in order to permit ventilating air to flow radially from the passages 14 to the periphery of the rotor to more effectively remove heat from the conductors of the winding 10. In accordance with the present invention, this radial ventilating duct is formed by means of one or more vent laminations 16 placed between the laminations of the core 6 to space the core laminations apart. As more clearly shown in Fig. 2, the vent laminations 16 are disposed coaxially with the laminations of the core 6, but are of smaller diameter, the outside diameter of the vent laminations preferably being less than the diameter at the bottom of the slots 9. The vent laminations 16 have a plurality of generally radial arms 17, which form relatively large slots 18 between them, the proportions being such that the slots 18 extend inward past the axial ventilating passages 14, and the slots 18 correspond in number and angular position with the passages 14, so that the passages communicate with the slots, and thus with the radial duct formed by the vent laminations 16.

The vent laminations may be made of any suitable material, such as the thin sheet steel from which the laminations of the core 6 are punched, or of any other suitable rigid material, either conducting or insulating, such as brass, hard fiber, or other suitable material. Any desired number of vent laminations may be utilized, to provide a radial duct of the desired width, and it will be apparent that two or more ducts might be provided, spaced apart axially of the core 6, if the length of the rotor member is such as to make the use of a plurality of ducts desirable.

It should now be apparent that a rotor construction has been provided in which a radial ventilating duct is formed in the rotor in a simple and inexpensive manner. The vent laminations can readily be punched from sheet material at relatively low cost, as compared to the finger plates which have been used heretofore, and since the diameter of the vent laminations is less than the diameter of the core laminations, the spaces between the conductors of the winding 10 are left open and unrestricted, to permit maximum flow of air, and to eliminate any substantial risk of these openings becoming filled, or partially filled, with varnish.

A preferred embodiment of the invention has been shown and described for the purpose of illustration, but it will be obvious that the invention may be embodied in other types of machines, and that various modifications are possible within the scope of the invention. It is to be understood, therefore, that the invention is not restricted to the specific embodiment or details of construction shown, but in its broadest aspects it includes all equivalent embodiments and modifications.

We claim as our invention:

A dynamoelectric machine having a stator member and a rotor member, said rotor member including a laminated rotor core comprising a plurality of thin laminations disposed in contact with each other in a stack, said core having peripheral slots and a winding in said slots, the rotor core having a plurality of axial ventilating passages extending therethrough, and a plurality of vent laminations disposed between certain of the laminations of the core and spacing the core laminations apart to form a radial duct, said vent laminations being coaxial with the core laminations and having generally radial arms, the diameter of the vent laminations at the ends of the arms being less than the diameter at the bottom of said slots of the core laminations to provide circumferential cooling passages at the bottom of said winding, and the radial arms forming slots between them communicating with said axial ventilating passages and extending to the periphery of the vent laminations.

References Cited in the file of this patent

UNITED STATES PATENTS

| | | |
|---|---|---|
| 401,318 | Weston | Apr. 9, 1889 |
| 422,681 | Wray | Mar. 4, 1890 |
| 561,590 | Ide | June 9, 1896 |
| 890,577 | Richards | June 9, 1908 |
| 925,271 | Behrend | June 15, 1909 |
| 2,486,798 | Mollenhauer | Nov. 1, 1949 |

FOREIGN PATENTS

| | | |
|---|---|---|
| 200,073 | Germany | June 29, 1908 |
| 876,777 | France | Aug. 17, 1942 |